Figure 1:
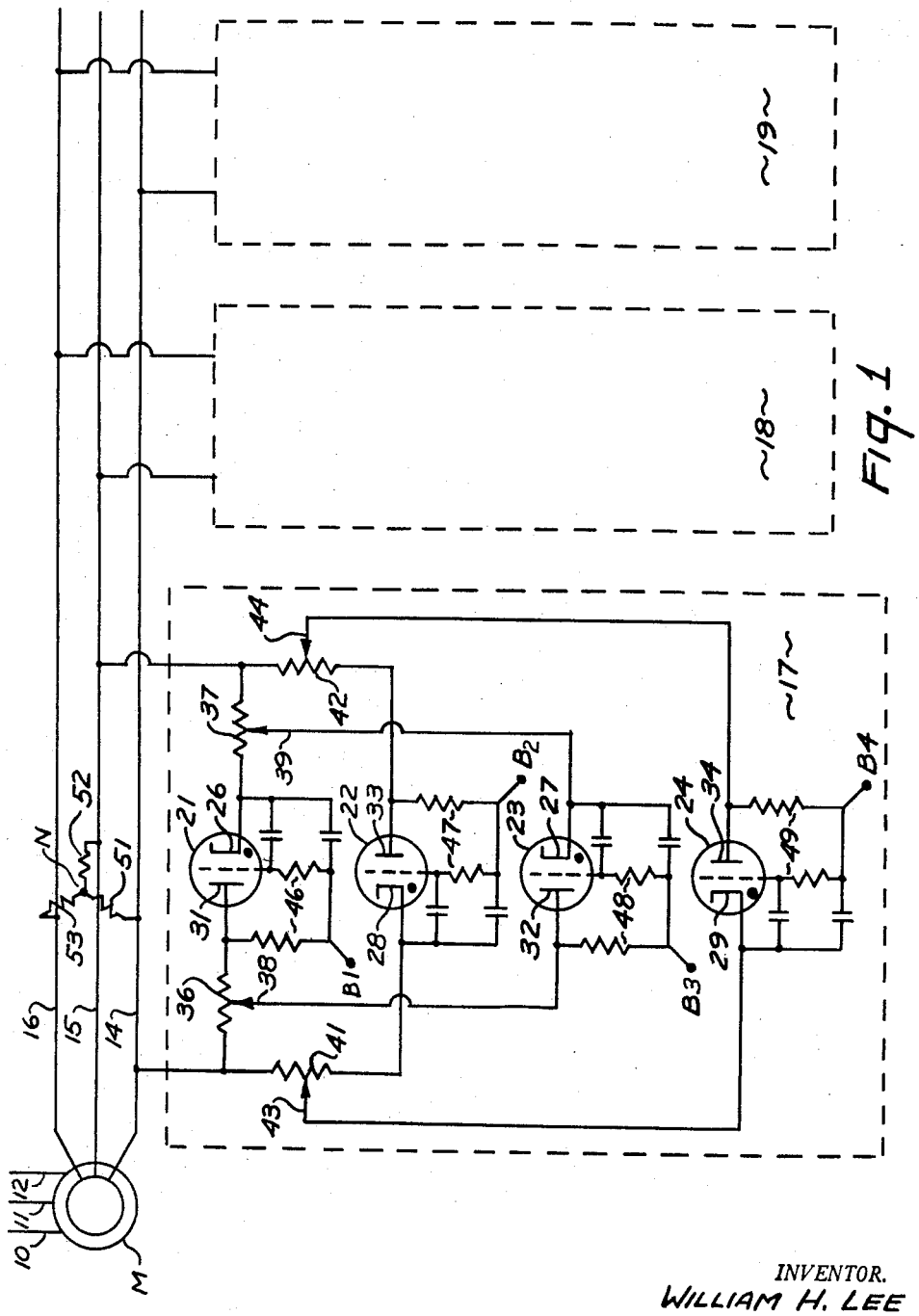

United States Patent Office

2,924,765
Patented Feb. 9, 1960

2,924,765

CONTROL CIRCUIT FOR INDUCTION MOTORS

William H. Lee, Willoughby, Ohio

Application January 28, 1959, Serial No. 789,630

10 Claims. (Cl. 318—237)

This invention relates to control means for wound rotor induction motors and especially to means for controlling the speed of such motors by control of the impedance of the secondary.

Wound rotor induction motors are highly desirable in many applications because of their simple construction, dependability and efficiency. Their use has been limited, however, by the lack of efficient and simple means for controlling their speed under varying load conditions. Since the speed is a function of the torque developed by the rotor and the load on the motor, various means of speed control have been proposed whereby the torque is varied by changing the impedance of the rotor or secondary circuit. The impedance of the rotor can be controlled, for example, by inserting a mechanically variable resistance or rheostat in the rotor circuit which limits the rotor current and, thus, the torque developed by the rotor.

Such a method of speed control is expensive and inefficient. Automatic speed control is difficult because it is necessary to mechanically vary the amount of resistance in the secondary circuit and, at best, the resistance can only be varied in steps. In addition, a relatively large and expensive bank of polyphase resistors or rheostat is required to provide control of the motor throughout its operating range. The control is inefficient to operate because of the large amount of power consumed in the resistors, and during high speed operation, large amounts of the resistor bank are idle contributing further to the inefficiency of the system.

Another type of rotor impedance control that has been proposed involves the use of electronic controls embodying static switching devices such as thyratrons to control the effective impedance of the rotor circuit. Such a control of this type is described in my copending application, Serial No. 695,016. This type of control operates essentially in a switching mode to turn on and off the flow of rotor current thereby providing variable effective rotor impedance. Such a control does provide a simple, inexpensive, and efficient means for varying the speed of a wound rotor induction motor, but at high effective impedance, the power factor is low because the thyratrons fire late in the positive half cycles of their plate voltages and as a result, controls embodying thyratrons without resistance do not give as high starting torque as can be obtained with resistance.

This invention relates, therefore, to a control for a wound rotor induction motor in which the rotor or secondary current is varied by resistance and static electronic switching devices such as thyratrons connected into the rotor circuit. The thyratrons, acting as switches, provide a variable effective impedance that smoothly meters an average flow of rotor current and, at the same time, provide means for smoothly varying the amount of electrical resistance of the secondary. The control of this invention requires only a low power D.C. control signal to operate it and is readily adaptable to automatic constant speed control of a wound rotor induction motor. Also, the control requires substantially less resistance externally of the motor secondary than the heretofore known variable resistance type of controls resulting in high efficiency and little loss of power in the control circuit. The control is composed of static electronic and electrical elements that are not subject to mechanical wear.

Briefly, my invention accomplishes the foregoing objects with banks of D.C. voltage controlled thyratrons connected in parallel across each phase of the rotor winding. In series with each of the thyratrons in a bank, I provide electrical resistance. With such an arrangement, a continuously variable effective impedance and electrical resistance to the flow of rotor current can be provided by a control signal which advances the firing angle from no conduction to full half wave conduction of each of the thyratrons in a bank in sequence. When only the thyratron in one parallel path is conducting, the rotor current is metered through the largest amount of electrical resistance. As the thyratrons in additional parallel paths conduct, the total electrical resistance to the thyratron controlled current becomes less.

Figure 2:
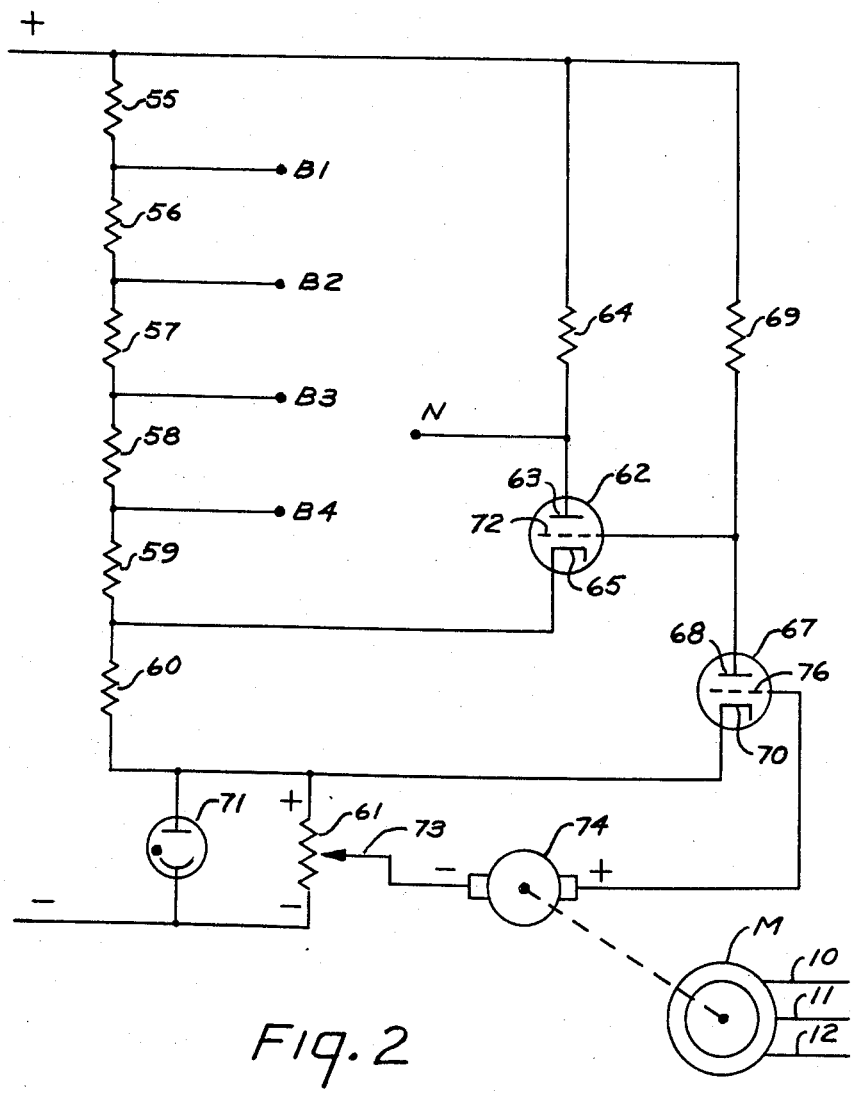

Referring now to the drawings which illustrate a preferred form of the invention:

Figure 1 is a diagram showing the circuit for controlling a three phase wound rotor induction motor; and Figure 2 is a diagram showing the circuit for providing the D.C. control signal to the circuit in Figure 1 for automatic constant speed control of the motor.

In Figure 1 is shown a conventional three phase wound rotor induction motor having a stator or primary supplied with three phase A.C. power from conductors 10, 11 and 12. Conductors 14, 15 and 16 are connected to the secondary windings on the rotor by means of the usual slip rings. Identical impedance control circuits 17, 18 and 19 are associated with each phase of the secondary winding of the motor through the secondary conductors 14, 15 and 16. Impedance control circuit 17 is connected across secondary conductors 14 and 15; impedance control circuit 18, across secondary conductors 15 and 16; and impedance control circuit 19, across conductors 14 and 16. Because each of the impedance control circuits 17, 18 and 19 are identical, only control circuit 17 has been shown in full detail and it is understood that the description and operation of this circuit applies to impedance control circuits 18 and 19 as well.

Impedance control circuit 17 comprises four thyratrons 21, 22, 23 and 24 arranged generally so that their plate circuits are in parallel with each other and across secondary conductors 14 and 15. The thyratrons are connected so that cathode 26 of thyratron 21 and cathode 27 of thyratron 23 are connected to secondary conductor 15 while cathode 28 of thyratron 22 and cathode 29 of thyratron 24 are connected to secondary conductor 14. Anodes 31 and 32 of thyratrons 21 and 23, respectively, are connected to secondary conductor 14 and anodes 33 and 34 of thyratrons 22 and 24, respectively, are connected to secondary conductor 15. This arrangement of the thyratrons provides for two one-way conduction paths in each direction between secondary conductors 14 and 15.

Connected in series with the conduction path through thyratron 21 are two potentiometers 36 and 37, one on each side of the thyratron. Cathode 27 of thyratron 23 is connected to the movable contact 39 of potentiometer 37 and anode 32 to the movable contact 38 of potentiometer 36 placing thyratron 23 across secondary conductors 14 and 15 in series with a portion of the resistance in series with thyratron 21 as well as in parallel to thyratron 21.

Anode 33 of thyratron 22 is connected in series with potentiometer 42 to conductor 15 and cathode 28 is connected in series with potentiometer 41 to conductor 14. Anode 34 and cathode 29 of thyratron 24 are connected in series with movable contact 44 of potentiometer 42 and contact 43 of potentiometer 41, respectively. The plate circuit of thyratron 22 is thus connected in series with the entire resistance of potentiometers 41 and 42 across conductors 14 and 15 and thyratron 24 is connected across conductors 14 and 15 in series with a portion of each of potentiometers 41 and 42 and in parallel to thyratron 23. Thus, thyratrons 21 and 23 and their associated series-connected potentiometers 36 and 37 provide a parallel combination between conductors 14 and 15 that is in parallel to a similar parallel combination made up of thyratrons 22 and 24 and their associated series-connected potentiometers 41 and 42 between conductors 14 and 15.

Identical but independent grid control circuits 46, 47, 48 and 49, associated with thyratrons 21, 22, 23 and 24, respectively, are employed to fire their respective thyratrons in response to a D.C. voltage control signal. The control signal is applied between the neutral point N of three Y-connected resistors 51, 52 and 53 connected to secondary conductors 14, 15 and 16, respectively, and control points $B_1$, $B_2$, $B_3$ and $B_4$ of grid control circuits 46, 47, 48 and 49, respectively. The control signal may be applied manually or otherwise from D.C. sources. As the potential of a control point is raised relative to the potential of neutral point N by the D.C. control signal, the associated thyratron fires over increasingly larger angles. The manner in which the D.C. control signal thus applied controls the firing of the thyratrons is fully described in my copending application, Serial No. 695,016.

Impedance control circuit 17 and, likewise, impedance control circuits 18 and 19 operate to vary the effective impedance and electrical resistance to the flow of current in one phase of the secondary of motor M in the following manner: At low speeds or light loads, the control voltages applied between the neutral N and the control points $B_1$, $B_2$, $B_3$ and $B_4$ of the grid control circuits are such that thyratron 21 fires and conducts secondary current for a portion of a half cycle of secondary voltage through the entire resistance of potentiometers 36 and 37. Thyratrons 22, 23 and 24 are turned off at this time. As the load on the motor is increased or a higher rotor speed is desired, a control voltage is applied to the grid control circuits which increases the firing angle of thyratron 21 until it conducts over a substantially full half cycle. As the load or speed is further increased, a control voltage is applied which also allows thyratron 22 to begin conducting and to fire at increasingly large angles until it is conducting over a large portion of a half cycle. In like manner, thyratrons 23 and 24 are successively made to conduct at increasing firing angles. At full load or high speed, the firing angles of the thyratrons are advanced the maximum amount and each thyratron carries secondary current during large portions of a half cycle. The alternative inverse connection of the thyratrons with respect to each other provides for a smooth control of the secondary current during both positive and negative half cycles. Such an arrangement, while preferred, is not necessary, however, and effective secondary impedance control can be obtained when the thyratrons are all arranged to conduct during the same half cycle.

Thus, by means of an easily controlled low power D.C. signal voltage, the effective impedance of the secondary circuit of a wound rotor induction motor is easily and almost instantaneously varied. At the same time and by the same control means, the electrical resistance of the secondary circuit is varied smoothly and easily to provide high torque per ampere of secondary current under all conditions of load and speed. As the thyratrons are successively fired and additional paths of electrical resistance are inserted in parallel to each other in the secondary of the motor M, there is a decreasing amount of electrical resistance in the secondary circuit. The result is a wound rotor induction motor having a high torque output per ampere of secondary current throughout its range of speed and load and whose speed can be easily and smoothly controlled by a low power D.C. voltage applied to a circuit comprised of reliable and relatively inexpensive static elements. The control is more efficient than other known methods for providing a variable resistance in the secondary of wound rotor induction motors because by this invention less power-consuming resistance is employed.

In the preferred embodiment shown in Fig. 1, I have shown a bank of parallel conduction paths provided by four thyratrons connected in each phase of the motor. It will be understood that more or fewer conduction paths may be used by providing more or fewer thyratrons and electrical resistance elements depending on the torque characteristics desired of the motor. I have found that a control comprised of four parallel paths per phase of a three phase motor provides a high level of torque output per ampere of rotor current throughout the speed range from no load to full load. The control also is applicable to polyphase wound rotor induction motors other than three phase.

Figure 2 illustrates the means I prefer to employ to provide the proper control signal for automatic operation of the motor at a constant speed and under varying load conditions. This circuit consists of a voltage divider made up of resistors 55, 56, 57, 58, 59, 60 and potentiometer 61 connected in series across a source of D.C. potential having a polarity as indicated in Figure 2. Arranged in parallel with a portion of the voltage divider is triode 62 having its plate 63 connected in series with a load resistor 64 to the positive side of the D.C. source and its cathode 65 connected to the voltage divider between resistors 59 and 60. Connected in parallel to the voltage divider and triode 62 is a second triode 67 having its plate 68 connected in series with a load resistor 69 to the positive side of the D.C. source and its cathode 70 connected to the voltage divider between resistor 60 and potentiometer 61. The grid 72 of triode 62 is connected to the plate circuit of triode 67 between plate 68 and load resistor 69.

Four voltage taps, designated $B_1$, $B_2$, $B_3$ and $B_4$, are provided on the voltage divider between resistors 55 through 59 as indicated in Figure 2. Each of these voltage taps is connected to the signal input point of the grid control circuits designated in like manner in Figure 1. A neutral point N is tapped from the plate circuit of triode 62 between the plate 63 and the load resistor 64 and is connected to neutral point N in Figure 1.

A voltage reference tube 71 is provided in parallel with potentiometer 61 to maintain a constant potential across this resistance regardless of fluctuations in the voltage of the D.C. source. A movable contact 73 of potentiometer 61 is connected to the negative side of the output of a D.C. tachometer generator 74 driven by motor M. The positive side of the output of the tachometer generator 74 is connected to the grid 76 of triode 67 and provides the control potential for this triode.

This control circuit provides the proper D.C. potential to each of the control grid circuits 46, 47, 48 and 49 of the motor control circuit to operate the motor at a predetermined constant speed and at a high torque output per ampere of secondary current from no-load to full-load conditions. Briefly, this result is accomplished by raising or lowering the potential of neutral point N with respect to grid circuit control points $B_1$, $B_2$, $B_3$ and $B_4$. Because of the relative difference in potential of each of these grid control points provided by the voltage divider, changing the potential of neutral point N provides in sequence a changing potential difference between each of the control points $B_1$, $B_2$, $B_3$, $B_4$ and neutral point N. For example, when neutral point N is at a certain positive potential with respect to control point B₁, no thyratrons will conduct, resulting in an open rotor circuit. As the potential of neutral point N is lowered, a decreasingly negative D.C. potential is applied through control point B₁ to control grid circuit 46 firing thyratron 21 and continuing to fire it at increasingly large angles. A further decrease in the potential of neutral point N results in a reduced potential between control point B₂ and neutral point N, firing thyratron 22 of the motor control circuits through its associated grid control circuit 47. Continued lowering of the potential of neutral point N successively provides a reduced potential between control points B₃ and B₄ and point N that fires thyratrons 23 and 24 and advances their firing angles in sequence. The potential of neutral point N can be lowered until the potential applied through all of the control points to the control grid circuits, fires all of the thyratrons at maximum conduction.

The circuit shown in Figure 2 operates to vary the potential of neutral point N in order to maintain a constant motor speed under varying load conditions as follows: Assume that the motor is operating at the desired speed and under a constant load and that the potential of neutral point N is at a level with respect to the grid circuit control points that provides the proper D.C. control potential to the thyratrons that will maintain this speed under these conditions. If the load is reduced, the speed of the motor increases resulting in an increase in the output of the D.C. tachometer 74. Grid 76 of triode 67 becomes more positive, increasing the plate current through triode 67 and its associated load resistor 69. The increase in current through load resistor 69 increases the potential drop across resistor 69 and lowers the potential of grid 72 of triode 62. This change in the grid potential of triode 62 decreases the plate current therethrough and through associated load resistor 64, decreasing the potential drop across resistor 64. This results in raising the potential of neutral point N relative to the potential of the grid control circuit points, thereby decreasing the conduction through the thyratrons and returning the speed of the motor to the desired level. If the load is increased and the motor slows down, the output of tachometer generator 74 decreases resulting in a lowering of the potential of neutral point N with respect to the grid circuit control points, producing a lesser impedance in the secondary of the motor and returning it to the desired speed.

Selection of the desired constant speed at which the motor is to operate is accomplished through potentiometer 61. By the adjustment of movable contact 73, the value of the constant biasing potential for grid 76 of triode 67 can be adjusted. Since the potentiometer is connected through the D.C. tachometer generator 74, the grid bias on triode 67 is always the sum of the adjustable level constant potential provided by potentiometer 61 and the varying potential output of the tachometer generator.

It will be understood that there may be as many grid control points as are necessary to control all the thyratrons that may be employed in the motor control circuit. Other means, which provide a D.C. voltage signal, may be utilized for independently controlling the grids of the thyratrons in the impedance control circuits to provide constant speed operation under varying load conditions, or a simple manual speed control as suggested in my aforesaid copending application may be utilized.

Those skilled in the art will appreciate that various other changes and modifications can be made in the preferred form of apparatus described herein without departing from the spirit and scope of the invention.

I claim:

1. An apparatus for controlling the speed and torque characteristics of a polyphase wound rotor induction motor comprising a plurality of parallel impedance paths in circuit with each phase of the motor secondary, each of said impedance paths comprising a resistance in series with an electronic switching device adapted to conduct unidirectionally, signal responsive control means associated with each of the switching devices for independently controlling their conduction periods whereby the speed and torque characteristics of the motor may be controlled by varying the electrical resistance to and the absolute flow of motor secondary current.

2. An apparatus for controlling the speed and torque characteristics of a polyphase wound rotor induction motor comprising a plurality of parallel impedance paths in circuit with each phase of the motor secondary, each of said impedance paths comprising a resistance in series with a thyratron having a control grid, signal responsive control means associated with the grid of each of the thyratrons for independently controlling their conduction periods whereby the speed and torque characteristics of the motor may be controlled by varying the electrical resistance to and absolute flow of motor secondary current.

3. An apparatus for controlling the speed and torque characteristics of a wound rotor induction motor comprising a pair of parallel impedance paths in circuit with each phase of the motor secondary, one of said impedance paths comprising a resistance in series with a thyratron having a control grid, and the other of said impedance paths comprising a thyratron having a control grid, means associated with the grid of each of the thyratrons for controlling their conduction periods whereby the speed and torque characteristics of the motor may be controlled by varying the electrical resistance to and absolute flow of motor secondary current.

4. An apparatus for controlling the speed and torque characteristics of a wound rotor induction motor comprising a plurality of parallel impedance paths in circuit with each phase of the motor secondary, each of said impedance paths comprising a resistance in series with a pair of parallel connected electronic switching devices arranged to conduct in opposite directions and controllable to conduct through varying portions of different half-cycles of applied secondary voltage, signal responsive control means associated with each of the switching devices for independently controlling their conduction periods whereby the speed and torque characteristics of the motor may be controlled by varying the electrical resistance to and absolute flow of motor secondary current.

5. An apparatus for controlling the speed and torque characteristics of a wound rotor induction motor comprising a plurality of parallel impedance paths in circuit with each phase of the motor secondary, each of said impedance paths comprising a resistance in series with an electronic switching device adapted to conduct unidirectionally, a portion of said electronic switching devices being arranged to conduct during one half cycle of operation, and the remainder of said electronic switching devices being arranged to conduct during the other half cycle of operation, signal responsive control means associated with each of the switching devices independently controlling their conduction periods whereby the speed and torque characteristics of the motor may be controlled by varying the electrical resistance to and absolute flow of motor secondary current.

6. An apparatus for controlling the speed and torque characteristics of a wound rotor induction motor comprising a plurality of parallel impedance paths in circuit with each phase of the motor secondary, each of a first group of said impedance paths comprising a resistance in series with an electronic switching device adapted to conduct in one direction and controllable to conduct through varying portions of half-cycles of applied voltage, each of a second group of said impedance paths associated with one of said first group and comprising an electronic switching device adapted to conduct in the same direction as its associated first group switching device and controllable to conduct through varying portions of half-cycles of applied voltage serially connected with a portion of said resistance in said associated path, signal responsive control means associated with each of the switching devices for independently controlling their conduction periods whereby the speed and torque characteristics of the motor may be controlled by varying the electrical resistance to and absolute flow of motor secondary current.

7. An apparatus for controlling the speed and torque characteristics of a wound rotor induction motor comprising a plurality of parallel impedance paths in circuit with each phase of the motor secondary, each of a first group of said impedance paths comprising a resistance in series with an electronic switching device controllable to conduct through varying portions of half-cycles of applied voltage, each of a second group of said impedance paths associated with one of said first group and comprising an electronic switching device controlable to conduct through varying portions of half-cycles of applied voltage connected in series with said resistance in said associated path and in parallel to said electronic switching device in said associated path, signal responsive control means associated with each of the switching devices for independently controlling their conduction periods whereby the speed and torque characteristics of the motor may be controlled by varying the electrical resistance to and absolute flow of motor secondary current.

8. An apparatus for maintaining constant the speed of a wound rotor induction motor comprising a plurality of parallel impedance paths in circuit with each phase of the motor secondary, each of said impedance paths comprising a resistance in series with an electronic switching device adapted to conduct unidirectionally, signal responsive control means associated with each of the switching devices for independently controlling their conduction periods whereby the speed and torque characteristics of the motor may be varied by control of the flow of motor secondary current through the parallel impedance paths, and automatic control means for providing control signals to said signal responsive means to maintain the speed of said induction motor constant under varying load conditions, said control means comprising a voltage divider having a plurality of voltage taps each of which is associated with one of said switching devices in said impedance paths, a source of potential applied across said voltage divider, a point of variable potential that varies in accordance with the speed of the motor with respect to the potential of the voltage taps whereby a control signal of increasing potential is successively applied to said switching devices when the motor speed falls below a predetermined desired speed and a control signal of decreasing potential is successively applied to said switching devices when the motor speed rises above a predetermined desired speed.

9. An apparatus for maintaining constant the speed of a wound rotor induction motor comprising a plurality of parallel impedance paths in circuit with each phase of the motor secondary, each of said impedance paths comprising a resistance in series with a thyratron having a control grid, signal responsive grid control circuits associated with the grid of each of the thyratrons for independently controlling their conduction periods whereby the speed and torque characteristics of the motor may be varied by control of the flow of motor secondary current through the parallel impedance paths, and automatic control means for providing voltage control signals to said grid control circuits to maintain the speed of said induction motor constant under varying load conditions, said control means comprising a voltage divider having a plurality of voltage taps each of which is associated with one of said grid control circuits, a source of potential applied across said voltage divider, a point of variable potential that varies in accordance with the speed of the motor with respect to the potential of the voltage taps whereby a control voltage of increasing potential is successively applied to said grid control circuits when the motor speed falls below a predetermined desired speed and a control voltage of decreasing potential is successively applied to said grid control circuits when the motor speed rises above a predetermined desired speed.

10. An apparatus for controlling the speed and torque characteristics of a wound rotor induction motor comprising a plurality of parallel impedance paths in circuit with each phase of the motor secondary, each of said impedance paths comprising a resistance in series with an electronic switching device adapted to conduct unidirectionally and controllable to conduct over varying portions of half-cycles of applied voltage, signal responsive control means associated with each of the switching devices for independently controlling their conduction periods whereby the speed and torque characteristics of the motor may be varied by control of the flow of motor secondary current through the parallel impedance paths, and control means for providing control signals to said signal responsive means, said control means being comprised of a voltage divider having a plurality of voltage taps each of which is associated with one of said signal responsive means, a source of potential applied across said voltage divider, means for providing a point of potential variable with respect to the potential of the voltage taps whereby a control signal of increasing potential may be successively applied to said signal responsive means to increase the flow of motor secondary current and a control signal of decreasing potential may be successively applied to said signal responsive means.

No references cited.